(12) United States Patent
Li et al.

(10) Patent No.: US 8,619,721 B2
(45) Date of Patent: Dec. 31, 2013

(54) METHOD, SYSTEM AND EQUIPMENT FOR IMPLEMENTING MACRO DIVERSITY COMBINING

(75) Inventors: Rongqiang Li, Shenzhen (CN); Yafei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 558 days.

(21) Appl. No.: 12/727,131

(22) Filed: Mar. 18, 2010

(65) Prior Publication Data

US 2010/0189067 A1 Jul. 29, 2010

Related U.S. Application Data

(63) Continuation of application No. PCT/CN2008/072354, filed on Sep. 12, 2008.

(30) Foreign Application Priority Data

Sep. 21, 2007 (CN) .......................... 2007 1 0077250

(51) Int. Cl.
*H04B 7/216* (2006.01)
(52) U.S. Cl.
USPC ............ 370/335; 455/436; 370/329; 370/312
(58) Field of Classification Search
USPC .......................... 370/312, 329, 335; 455/436
See application file for complete search history.

(56) References Cited

U.S. PATENT DOCUMENTS

| | | | |
|---|---|---|---|
| 6,628,924 B1 * | 9/2003 | Miyamoto | 455/69 |
| 6,728,227 B1 * | 4/2004 | Ohtani et al. | 370/331 |
| 6,792,273 B1 * | 9/2004 | Tellinger et al. | 455/442 |
| 7,403,992 B2 * | 7/2008 | Tilander et al. | 709/224 |
| 7,664,467 B2 * | 2/2010 | Cheng et al. | 455/70 |
| 8,095,084 B2 * | 1/2012 | Rune | 455/101 |
| 8,135,428 B2 * | 3/2012 | Shinozaki | 455/522 |
| 2003/0161284 A1 * | 8/2003 | Chen | 370/331 |
| 2007/0291674 A1 * | 12/2007 | Cheng et al. | 370/312 |
| 2008/0026759 A1 * | 1/2008 | Sawamoto | 455/436 |
| 2008/0056197 A1 * | 3/2008 | Ohtani et al. | 370/331 |
| 2008/0170504 A1 * | 7/2008 | Petrovic et al. | 370/235 |

(Continued)

FOREIGN PATENT DOCUMENTS

| | | |
|---|---|---|
| CN | 1905730 A | 1/2007 |
| CN | 1929674 A | 3/2007 |

(Continued)

OTHER PUBLICATIONS

"3rd Generation Partnership Project; Technical Specification Group Radio Access Network; HSPA Evolution (FDD); (Release 7)," 3GPP TR 25.999, Technical Report, 61 pages.

(Continued)

*Primary Examiner* — Phuc Tran
(74) *Attorney, Agent, or Firm* — Slater & Matsil L.L.P.

(57) ABSTRACT

A method, system, base station, network node, and user equipment for implementing macro diversity combining (MDC) are disclosed. In the method, a base station judges whether user equipment service data meets a condition for allocating demodulation resources. The base station allocates demodulation resources for service data meeting the condition, demodulates the service data and forwards the demodulated service data to a network node for implementing MDC.

18 Claims, 5 Drawing Sheets

(56) References Cited

U.S. PATENT DOCUMENTS

| | | | |
|---|---|---|---|
| 2008/0198783 A1* | 8/2008 | Manos et al. | 370/310.1 |
| 2008/0214230 A1* | 9/2008 | Shinozaki | 455/522 |
| 2009/0011766 A1* | 1/2009 | Ohtani et al. | 455/437 |
| 2009/0219849 A1* | 9/2009 | Alpert et al. | 370/312 |
| 2009/0238150 A1* | 9/2009 | Barrett | 370/335 |
| 2009/0245272 A1* | 10/2009 | Peisa et al. | 370/428 |
| 2009/0312042 A1* | 12/2009 | Rudrapatna | 455/501 |
| 2012/0028644 A1 | 2/2012 | Li | |
| 2012/0244870 A1 | 9/2012 | Umesh et al. | |

FOREIGN PATENT DOCUMENTS

| | | |
|---|---|---|
| CN | 101227747 A | 7/2008 |
| CN | 101394209 B | 2/2013 |
| KR | 10-2006-0090625 A | 8/2006 |
| WO | WO 2009/097820 A1 | 8/2009 |

OTHER PUBLICATIONS

Written Opinion of the International Searching Authority, PCT/CN2008/072354, Date of mailing Dec. 25, 2008, 6 pages.

Supplemental European Search Report, Application No. 08800862.8-2411, PCT/CN2008072354, Date of mailing Oct. 28, 2010, 7 pages.

R3-071612, "Draft Enhancements to Macro Diversity & Cell Interference Control," 3GPP TSG-RAN WG3 Meeting #57, Athens, Greece, Aug. 20-24, 2007, 97 pp.

R3-071207, "Enhancement of Uplink Macro Diversity Combining in Flat Evolved HSPA Architecture," 3GPP TSG RAN WG3 Meeting #56, Kobe, Japan, May 7-11, 2007, 4 pp.

R3-071472, "Proposal of Inteference Control and MDC in eHSPA Architecture," 3GPP TSG RAN WG3 Meeting #57, Athens, Greece, Aug. 20-24, 2007, 8 pp.

R3-071348, "Service Differentiated Uplink Macro Diversity Combining in Flat Evolved HSPA Architecture," 3GPP TSG RAN WG3 Meeting #57, Athens, Greece, Aug. 20-24, 2007, 3 pp.

$3^{rd}$ Generation Partnership Project; Technical Specification Group Radio Access Network; FDD Enhanced Uplink; Overall description; Stage 2 (Release 6), Mar. 2006, 34 pp.

First Chinese Office Action, Chinese Application No. 200710077250.5, Dated: Jul. 18, 2011, 13 pages.

Office Action received in European Patent Application No. 08800862.8, dated May 22, 2012, 6 pages.

Communication pursuant to Article 94(3) EPC received in European Application No. 08-800862.8-2411, Applicant: Huawei Technologies Co., Ltd., received Jan. 22, 2013, 5 pages.

* cited by examiner

METHOD, SYSTEM AND EQUIPMENT FOR IMPLEMENTING MACRO DIVERSITY COMBINING

This application is a continuation of International Application No. PCT/CN2008/072354, filed on Sep. 12, 2008, which claims priority to Chinese Patent Application No. 200710077250.5, filed Sep. 21, 2007, both of which are hereby incorporated by reference in their entireties.

TECHNICAL FIELD

The present invention relates to network communication technologies, and in particular, to a method, system, base station, network node, and user equipment (UE) for implementing macro diversity combining.

BACKGROUND

A universal mobile telecommunications system (UMTS) is a third generation (3G) mobile communication system that adopts the wideband code division multiple access (WCDMA) air interface technology. The UMTS is also called a WCDMA communication system. In the UMTS system, the coverage areas of adjacent cells may overlap. The UMTS system may provide seamless handover by using soft handover technology, and the achieved gains through macro diversity combining (MDC) may increase the anti-interference capability of the UMTS system.

3G technologies are evolving along with the development of mobile communication technologies. High speed uplink packet access (HSUPA) is introduced in Release 6 (R6) of the 3GPP. HSUPA also supports the uplink macro diversity technology.

The implementation process of MDC is briefed as follows. During the soft handover, a UE and multiple base stations communicate through two different air interface channels at the same time. On the uplinks, the multiple NodeBs receive uplink user data in code-division channels of the UE. All the multiple NodeBs send the received uplink user data to a radio network controller (RNC) for selection and combination. The RNC selects the better uplink user data from the uplink user data sent by the multiple NodeBs by using a frame reliability indicator for outer loop power control, and sends the selected data to the core network.

The preceding network architecture is based on architectures of versions earlier than 3GPP R6. To prolong the lifecycle of the WCDMA system and protect the operator's investments, the 3GPP proposes a research program on an evolved high speed packet access (E-HSPA) evolution, aiming to improve spectrum efficiency based on R6 and reduce the delay of the control plane and user plane. In addition, the purpose of the program is to realize that E-HSPA is compatible with earlier versions and is able to evolve into the long term evolution/system architecture evolution (LTE/SAE) system smoothly, including improvement of air interface performance and evolution of radio access network (RAN) architecture.

In an E-HSPA network, the RNC's functions are transferred to an E-HSPA NodeB (NodeB+). The NodeB+ is directly connected to the core network through the IuPS interface.

The process of implementing MDC on the E-HSPA network is as follows. Uplink MDC is implemented in a serving NodeB of the user. For data on all the radio links in an active set, if the received data on a radio link corresponding to a non-serving NodeB is correct, the non-serving NodeB sends the uplink data to the serving NodeB; after performing MDC on the received uplink data, the serving NodeB sends the data to the core network. This solution is similar to the MDC implementation solution in the RNC of a current 3G system except that the functions are implemented by the serving NodeB other than by the RNC. If the uplink macro diversity is implemented in the serving NodeB (including the serving RNC function), communications between NodeBs are necessary. If other soft-handover NodeBs send received uplink data to the serving NodeB for macro diversity processing, the interface between NodeBs may have transmission overload (last-mile transmission resource) and the user plane may have delay.

During the implementation of the present invention, the inventor finds at least the following problem in the prior art. During the MDC implementation in a WCDMA system using HSUPA or E-HSPA, a non-serving NodeB always needs to allocate demodulation resources for all the service data. In practical applications, some services with certain features (for example, the high-speed non-real-time service) obtain only small gains by using MDC. Thus, it is not worth the candle in terms of the system as a whole to obtain only small gains with a large quantity of demodulation resources.

To sum up, the prior art does not fully consider the fact that services with different features may obtain different gains by using MDC but always requires demodulation resources, thus wasting demodulation resources.

SUMMARY OF THE INVENTION

Embodiments of the present invention provide a method, base station, network node, UE, and system for implementing MDC, so that the base station may judge whether UE service data meets a condition for allocating demodulation resources, determine whether to demodulate the service data, and forward the demodulated service data to a network node for implementing MDC. Thus, MDC is implemented in a more flexible mode, the utilization of uplink demodulation resources is improved, and the system performance is optimized.

A method for implementing MDC in an embodiment of the present invention includes judging, by a base station, whether UE service data meets a condition for allocating demodulation resources; and by the base station, allocating demodulation resources for the service data meeting the condition, demodulating the service data, and forwarding the demodulated service data to a network node for implementing MDC.

A base station provided in an embodiment of the present invention is configured to implement MDC. The base station includes a judging unit configured to judge whether UE service data meets a condition for allocating demodulation resources. A processing unit is configured to allocate demodulation resources for the service data meeting the condition, demodulate the service data according to the judgment result of the judging unit, and forward the demodulated service data to a network node for implementing MDC.

A network node provided in another embodiment of the present invention is configured to implement MDC. The network node includes an indicating unit configured to send a first indication message to a base station, where the first indication message indicates whether the UE service data received by the non-serving base station needs to undergo MDC. An MDC unit is configured to receive service data forwarded by the base station and implement MDC for the received service data.

A UE provided in another embodiment of the present invention is configured to implement MDC. The UE includes an indication receiving unit configured to receive an indication message from a network node for implementing MDC. The indication message indicates that the high-speed packet access service data that needs to undergo MDC and the high-speed packet access service data that does not need to undergo MDC need to be contained into different transport blocks of air interface. A processing unit is configured to contain the high-speed packet access service data that needs to and does not need to undergo MDC into different transport blocks of air interface according to the indication received by the indication receiving unit. A sending unit is configured to send transport blocks of the air interface processed by the processing unit to a base station.

A communication system provided in another embodiment of the present invention is configured to implement MDC. The communication system includes a base station configured to receive UE service data from a UE, judge whether the UE service data meets a condition for allocating demodulation resources, allocate demodulation resources for service data meeting the condition, demodulate the service data, and forward the demodulated service data to a network node for implementing MDC. The network node is configured to receive service data forwarded by the base station and implement MDC for the received service data.

Embodiments of the present invention may bring a number of benefits. For example, the technical scheme of the present invention uses a base station to judge whether UE service data meets preset condition for allocating demodulation resources and allocate demodulation resources for the service data meeting the preset condition. Thus, MDC is implemented in a more flexible mode, the utilization of uplink demodulation resources is improved, and the system performance is optimized.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
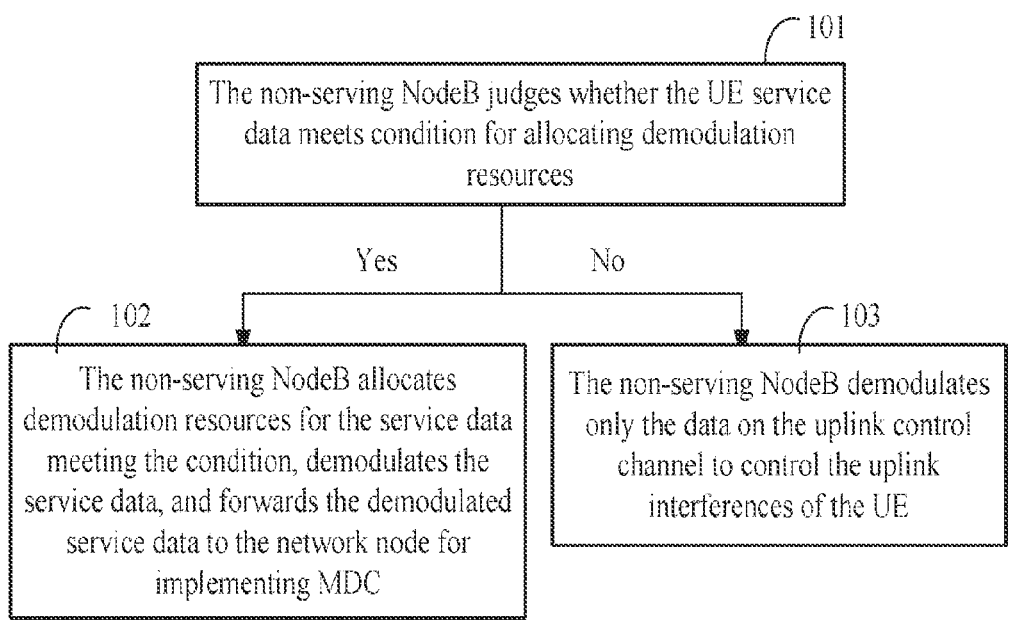
FIG. 1 is a schematic flowchart of a method for implementing MDC in a WCDMA system in a first embodiment of the present invention.

The following describes the method for implementing MDC with reference to exemplary embodiments and accompanying drawings. It is understandable that these embodiments are examples only and not intended to limit the scope of protection of the present invention. The scope of protection of the present invention is subject to the claims. In addition, embodiments of the present invention are described based on the WCDMA and E-HSPA systems. It is understandable that the technical scheme of the present invention is also applicable to the LTE/SAE system. The network node for implementing MDC may be different network elements (NEs) in different systems. For example, the network node is the RNC in the WCDMA system; the network node is the serving NodeB (enhanced NodeB+ with SRNC functions) in the E-HSPA system; the network node is the serving NodeB (evolved NodeB, E-NodeB) in the LTE system. The base station in the following embodiments is a non-serving base station of a UE during MDC implementation. When a radio link priority solution is involved, the base station acts as the non-serving base station of a UE (for example, UE1) and also the serving base station of another UE (for example, UE2).

During the implementation of the method, the non-serving base station determines whether to allocate demodulation resources for the service according to whether the UE1 service data meets a condition for allocating demodulation resources, and then performs subsequent processes.

The condition for allocating demodulation resources may be set by the system. For example, the condition may be set by the operation & maintenance center (OMC). After the system sets the condition or the condition is preset in each network node (for example, the NodeB and RNC in the WCDMA system, and NodeB in the E-HSPA or LTE/SAE system) or the condition is preset in one or more network nodes, the network nodes configured with the condition inform other network nodes of the condition. Or, the judgment condition may be set in the non-serving base station only because the non-serving base station is directly related to the judgment condition.

Flexible condition may be set. For example, the condition may be any of the following:

1. Service Rate of the Service Data

Whether to allocate demodulation resources or not is determined according to whether the preset condition of the service rate is met or not. Whether the preset condition of the service rate is met or not may be determined by judging whether the size of a transport block (TB) of the service data meets a preset threshold or whether the spreading factor of the service data or other service rate related factor meets a preset threshold. The following takes the TB size as a condition.

Generally, the TB size has certain relations (not an absolute relation) with the service characteristic. For example, for a low-speed real-time service, the TB size is small; for a high-speed non-real-time service, the TB size is large. The non-serving base station allocates demodulation resources for the low-speed real-time service but not for the high-speed non-real-time service. Before demodulating the data, the non-serving base station does not know whether the service is a low-speed real-time service or a high-speed non-real-time service. By demodulating the control channel, the non-serving base station may know the TB size, which may indicate whether to allocate demodulation resources for the service. For a better and more accurate association, a reasonable threshold of the TB size may be set for the indication. For example, the TB size threshold may be set to "1000 bits." The TB size has certain relations with the service rate. Thus, this threshold is associated with a service at the rate of 500 kbps/100 kbps of 2 ms/10 ms HSUPA. For services associated with the TB greater than or equal to the threshold, no demodulation resource is allocated. For services associated with the TB smaller than the threshold, demodulation resources are allocated.

A similar relation also exists between the spreading factor and the service characteristic, which may be mapped to the service characteristic (service rate). The spreading factor is a sequence of numerical values, for example, 2, 4, 8, 16, 32, 64, 128, and 256. A spreading factor greater than or equal to 64 in this sequence may be selected as the spreading factor meeting a preset threshold (associated with a small service rate and TB size). The TB associated with the spreading factor that meets the preset threshold is similar to the small TB with the size smaller than the TB size threshold. The TB associated with the spreading factor that does not meet the preset threshold is similar to the large TB with the size greater than the TB size threshold. The scheme about whether the TB size meets the preset threshold is described in detail. The scheme about whether the spreading factor meets the preset threshold is a scheme parallel to the scheme about whether the TB size meets the preset threshold, and will not be further described in embodiments of the present invention.

2. Channel Carrying the Service Data

Generally, the channel carrying the service data has certain relations with the service characteristic. For example, low-speed services are generally carried on a dedicated channel (DCH), and such services may include circuit-switched (CS) service, signaling radio bearer (SRB) service, and R99 low-speed packet-switched (PS) service. Generally, demodulation resources need to be allocated for the services carried on the DCH. HSUPA services (including high-speed non-real time/real-time services) are generally carried on an E-DCH, and such services may include email transmission service and high-speed file upload service.

Similarly, before demodulating the data, the non-serving base station does not know the service characteristic. Thus, the non-serving base station may identify which services need to be allocated with demodulation resources according to the channel type.

It should be noted that low-speed services may also include the voice over IP (VOIP) service, gaming service close to the real-time service or low-speed interactive service and background service. These services may be carried on the DCH or E-DCH. If these services are carried on the E-DCH, no demodulation resource is allocated for them when only the channel type is considered. Thus, the judgment condition by TB size is more suitable for these services.

It should be noted that the judgment condition by channel type may be implemented through indication information in addition to system configuration. For example, the RNC may send indication information to the non-serving base station to instruct the non-serving base station to allocate demodulation resources for services carried on the DCH and not to allocate demodulation resources for services carried on the E-DCH.

3. Combination of Channel Type and TB Size (or Spreading Factor)

The preceding two judgment conditions may be combined to judge whether to allocate demodulation resources. For example, the base station may first judge according to the channel type, and then judge according to the TB size. Specially, for the DCH carrying voice or signaling, demodulation resources may be allocated statically; for services carried on an E-DCH, demodulation resources may be allocated according to judging the TB size. Generally, the TBs of low-speed real-time services such as VOIP and gaming are small in size, and may be demodulated.

Other judgment conditions may also be set so long as the non-serving base station can know the information before demodulating the data. The preset condition is not limited in embodiments of the present invention, and will not be further described.

After determining whether to allocate demodulation resources for UE service data, the non-serving base station may perform the following operations:

If the UE service includes a service that needs to be allocated with demodulation resources, the non-serving base station allocates demodulation resources for the service, demodulates the service data, and forwards the demodulated service data to a network node for implementing MDC. For example, the non-serving base station allocates demodulation resources for the service, demodulates the service data by using the allocated demodulation resources, encapsulates the demodulated service data into a data frame, and sends the encapsulated data frame to the network node for implementing MDC through an established user plane transport bearer.

For a service that does not need to be allocated with demodulation resources, the non-serving base station may demodulate the data on the uplink control channel of the air interface only and control uplink interferences of the UE. Of course, the non-serving base station may neither forward service data nor control interferences. In comparison, interference control is preferred.

As mentioned before, a base station may act as the non-serving base station of a UE (UE1) and the serving base station of another UE (UE2) at the same time during actual network operations. Thus, the base station may coordinate demodulation resources allocated for the radio link of the serving base station (serving radio link) and the radio link of the non-serving base station (non-serving radio link). Solutions are hereby provided in an embodiment of the present invention, for example, a solution of allocating demodulation resources dynamically according to the radio link priority. When allocating demodulation resources, the base station may regard the serving radio link (corresponding to the UE2) as high priority and the non-serving radio link (corresponding to the UE1) as low priority. Thus, when allocating demodulation resources, the base station gives top priority to the serving radio link. If demodulation resources are enough, the base station allocates demodulation resources for the non-serving radio link according to the preceding judgment conditions. If demodulation resources are insufficient, the serving radio link may preempt the demodulation resources that are already allocated for the non-serving radio link.

In this case, the serving radio link of higher priority may be considered combined with determining whether to allocate demodulation resources on the non-serving radio link. The following cases may exist:

A. Combination of Channel Type and Radio Link Priority

For example, the base station judges the channel type first, and may statically allocate demodulation resources for the DCH carrying voice or signaling of the UE1. If demodulation resources are insufficient, the base station gives top priority to the serving radio link according to the radio link priority. The serving radio link (corresponding to the UE2) may preempt the demodulation resources allocated for the DCH of the non-serving radio link (corresponding to the UE1). Of course, the serving radio link may not preempt the demodulation resources allocated for the DCH of the non-serving radio link. The implementation may be flexible.

In addition, as mentioned before, no demodulation resource is allocated for the E-DCH when only the channel type is considered. After the combination of channel type and radio link priority is considered, the base station may allocate demodulation resources for the DCH first, and then allocate demodulation resources for the E-DCH if demodulation resources are sufficient. The serving radio link may preempt the demodulation resources allocated for the non-serving radio link according to the following rule: The serving radio link may preempt the demodulation resources of the E-DCH only, or preempt the demodulation resources of the E-DCH first and then preempt the demodulation resources of the DCH.

B. Combination of TB Size (or Spreading Factor) and Radio Link Priority

For example, the base station judges the TB size of the UE1 first, and allocates demodulation resources for the small TB of the UE1. If demodulation resources are insufficient, the base station gives top priority to the serving radio link according to the radio link priority. The serving radio link (corresponding to the UE2) may preempt the demodulation resources allocated for the small TB of the non-serving radio link (corresponding to the UE1). Of course, the serving radio link may not preempt the demodulation resources of the small TB. The implementation may be flexible.

In addition, as mentioned before, no demodulation resource is allocated for the large TB when only the TB size is considered. After the combination of TB size and radio link priority is considered, the base station may allocate demodulation resources for the small TB first, and then allocate demodulation resources for the large TB if demodulation resources are sufficient. The serving radio link may preempt the demodulation resources allocated for the non-serving radio link according to the following rule: The serving radio link may preempt the demodulation resources of the large TB only, or preempt the demodulation resources of the large TB first and then preempt the demodulation resources of the small TB.

C. Combination of Channel Type, TB Size (or Spreading Factor) and Radio Link Priority For example, the base station judges the channel type first, and may statically allocate demodulation resources for the DCH carrying voice or signaling of the UE1. For services of the UE1 carried on the E-DCH, the base station judges the TB size first, and demodulates the small TB of the UE1 carried on the E-DCH. If demodulation resources are insufficient, the serving radio link (corresponding to the UE2) may preempt the demodulation resources of the small TB of the non-serving radio link (corresponding to the UE1). It is understandable that the serving radio link may preempt the demodulation resources of the small TB of the UE1 only. The serving radio link may also preempt the demodulation resources of the DCH of the UE1 after preempting the demodulation resources of the small TB. The solution for preempting the demodulation resources of the small TB only is preferred. The implementation may be flexible.

In addition, as mentioned before, no demodulation resource is allocated for the large TB of the E-DCH when the combination of TB size and channel type is considered. When the combination of TB size, channel type, and radio link priority is considered, the base station may allocate demodulation resources for the DCH first, and then allocate demodulation resources for the small TB of the E-DCH. Further, the base station may allocate demodulation resources for the large TB of the E-DCH if demodulation resources are sufficient. Then, the serving radio link may preempt the demodulation resources of the non-serving radio link according to the following rule: The serving radio link preempts the demodulation resources of the large TB of the E-DCH only, or preempts the demodulation resources of the E-DCH only (preempts the demodulation resources of the large TB before preempting the demodulation resources of the small TB), or preempts the demodulation resources of the E-DCH before preempting the demodulation resources of the DCH.

Another optional solution is: The base station may allocate demodulation resources for all the non-serving radio links (without differentiating the services of the non-serving link); if demodulation resources are insufficient upon the allocation, the serving radio link may preempt the demodulation resources of the non-serving radio link. Of course, if the demodulation resources are insufficient before the allocation, the base station allocates demodulation resources for the serving radio link first.

The technical solution of the present invention is hereinafter described in detail with reference to some exemplary embodiments.

A first embodiment takes the WCDMA system as an example. In this embodiment, it is supposed that the UE service includes a low-speed CS voice service and an HSUPA service. It should be noted that if the UE service includes a service that needs to or does not need to be allocated with demodulation resources, the service will not be further described in this embodiment because the processing is relatively simple. FIG. 1 is a flowchart of a method for implementing MDC in the first embodiment of the present invention.

Step 101: The non-serving NodeB judges whether the UE service data meets the condition for allocating demodulation resources. If the UE service data meets the condition for allocating demodulation resources, the process proceeds to step 102; otherwise, the process proceeds to step 103.

The preset condition in this embodiment may be whether the TB size is smaller than a preset threshold, for example, 1000 bits. Supposing the TB size of the CS voice service is 336 bits, which is smaller than the threshold, the non-serving NodeB allocates demodulation resources for the CS voice service; then the process proceeds to step 102. Supposing the TB size of the HSUPA service is 2058 bits, which is greater than the threshold, the non-serving NodeB does not allocate demodulation resources for the HSUPA service; then the process proceeds to step 103.

The preset condition in this embodiment may be based on a channel carrying the service data. That is, it may be based on whether the UE service data is carried on a channel that needs to be allocated with demodulation resources. Services that meet or do not meet the condition for allocating demodulation resources respectively correspond to different channels. For example, if a CS voice service and an HSUPA service are available, when establishing a non-serving radio link, the RNC may configure as follows: The DCH (carrying the CS voice service) needs to establish the transport bearer of the Iub interface (between the RNC and the NodeB), that is, MDC needs to be implemented for the services carried on the DCH; and the E-DCH (carrying the HSUPA service) does not need to establish the transport bearer, that is, MDC does not need to be implemented for the services carried on the E-DCH. As mentioned before, the non-serving NodeB may be informed, through system configuration or by indication information, that the DCH needs to be allocated with demodulation resources and that the E-DCH does not need to be allocated with demodulation resources. In this case, the non-serving NodeB does not allocate uplink demodulation resources for the E-DCH but allocates uplink demodulation resources for the DCH only. That is, the non-serving NodeB does not demodulate the HSUPA service but demodulates the CS voice service.

The non-serving NodeB may also judge in any other combined mode. For example, the non-serving NodeB may judge according to the channel type first, and then judge according to the TB size if the channel type meets the condition. Supposing the E-DCH carries a VOIP service besides the HSUPA service, the RNC informs the non-serving NodeB that services carried on the E-DCH and the DCH need to undergo MDC. Or, the non-serving NodeB knows that the services carried on the E-DCH and the DCH need to undergo MDC according to the system configuration. Then, the non-serving NodeB judges whether to allocate demodulation resources for the services carried on the DCH according to the TB size. For the services carried on the E-DCH, the non-serving NodeB determines to allocate demodulation resources for the VOIP service and not to allocate demodulation resources for the HSUPA service according to the TB size. Furthermore, because the TB sizes of the services carried on the DCH generally meet the TB size threshold, the non-serving NodeB may be set not to judge the TB size for the DCH and to judge the TB size for the services carried on the E-DCH in combined judgment mode only.

Other judgment modes will not be further described. It should be noted that the judgment condition concerning the radio link priority is described supposing the NodeB acts as a non-serving NodeB of a UE and a serving NodeB of another UE at the same time. To sum up, in the technical scheme of the present invention, the judgment mode is very flexible and may meet requirements of different scenarios.

Step 102: The non-serving NodeB allocates demodulation resources for the service data meeting condition, demodulates the service data, and forwards the demodulated service data to the network node for implementing MDC.

In this embodiment, the RNC is the network node for implementing MDC.

This step may further include the following sub-steps:

1021. After determining that the UE service includes a service that needs to be allocated with demodulation resources, the non-serving NodeB allocates demodulation resources for the service and demodulates the data on the uplink control channel and uplink data channel.

In this sub-step, the non-serving NodeB processes the uplink service data received from the UE that needs to be allocated with demodulation resources by demodulating the data on the uplink control channel and uplink data channel.

1022. The non-serving NodeB encapsulates the demodulated uplink service data into a data frame.

1023. The non-serving NodeB sends the encapsulated data frame to the RNC.

In sub-step 1023, the non-serving NodeB sends the data frame to the RNC on the user plane transport bearer. The data frame may be an FP data frame, i.e., may be a MAC-d flow of the FP packet header.

Certainly, the non-serving NodeB may send only the correct data to the RNC. Thus, data check details are hidden in step 102. These details are not provided herein because those skilled in the art are aware of these details. After the RNC receives the data frame, the step of performing MDC on the data frame is available in the prior art, and is omitted.

The process in this embodiment is described from the perspective of a non-serving NodeB. As mentioned before, this NodeB may be a serving NodeB of another UE (UE2) at the same time. After the step of allocating demodulation resources for the service data meeting condition, if demodulation resources are insufficient, the NodeB gives top priority to the serving radio link according to the radio link priority. The serving radio link (corresponding to the UE2) may preempt the demodulation resources allocated for the non-serving radio link (corresponding to the UE1). It is understandable that many judgment conditions are available in step 102. Accordingly, there are multiple optional solutions for preempting the demodulation resources of the non-serving radio link by the serving radio link in the case of insufficient resources. This has been described in detail, and is omitted.

Step 103: The non-serving NodeB demodulates only the data on the uplink control channel to control uplink interferences of the UE.

For the service data that does not need to be allocated with demodulation resources (data demodulation resources), the non-serving NodeB may exercise control as follows: The non-serving NodeB estimates the contribution of the UE to the uplink load of the cell according to the signal received from the uplink control channel, and controls the interferences of the UE according to the estimated result.

It should be noted that the step of controlling the interferences of the UE through the control channel is also available in step 102. The difference between step 102 and step 103 is as follows: In step 103, the non-serving NodeB does not allocate demodulation resources for the data; that is, the non-serving NodeB does not forward the uplink user data.

It should be noted that the preceding step 101 to step 103 are based on the fact that the non-serving NodeB knows that the UE service includes a service that needs to undergo MDC. The non-serving NodeB may know the information according to a preset rule of the system or according to indication information from the network node for implementing MDC. In addition, after determining that the service includes a service that needs to undergo MDC, the non-serving NodeB establishes a user plane transport bearer between the non-serving NodeB and the RNC.

Figure 2:
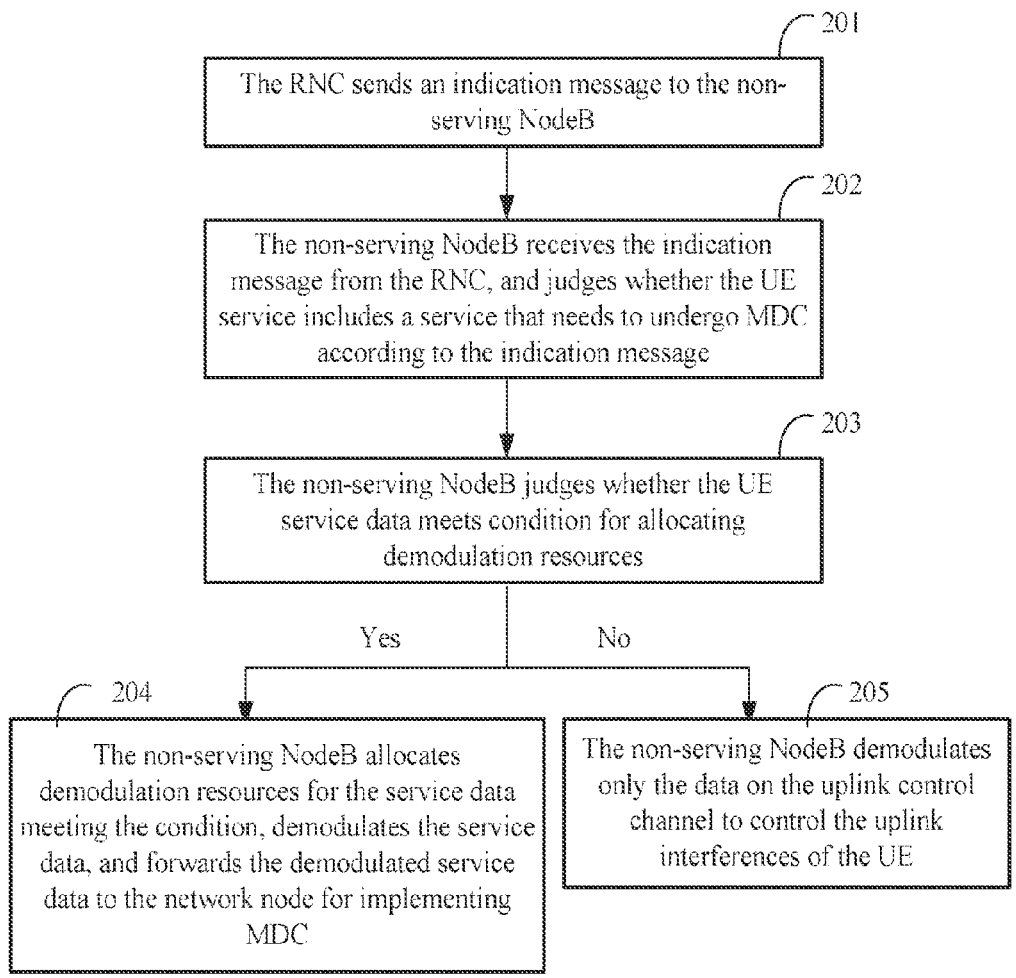
FIG. 2 is a schematic flowchart of a method for implementing MDC in a WCDMA system in a second embodiment of the present invention.

The technical solution provided in a second embodiment relates to a method for implementing MDC, which is still based on the WCDMA system. The non-serving NodeB knows whether the service includes a service that needs to undergo MDC according to the indication information of the RNC. Then, it continues the subsequent processes, as shown in FIG. 2.

Step 201: The RNC sends indication information to the non-serving NodeB.

In this step, the indication information may be a new indicator added to a message in the prior art (such as, Transport Bearer Not Requested Indicator). For example, this indicator is added to the Radio Link Setup message. It is known by those skilled in the art that the RNC needs to trigger the non-serving cell to set up a radio link carrying user services first in the soft handover state. During this process, the indication information is carried in the Radio Link Setup message. Similarly, the indication information may also be carried in messages such as Radio Link Addition, Synchronized Radio Link Reconfiguration Preparation, and Unsynchronized Radio Link Reconfiguration.

The specific implementation mode may be as follows: The RNC sets an optional indicator that may be carried or not carried for each MAC-d flow. In addition, the indicator may be set flexibly to indicate different meanings. For example, the Transport Bearer Not Requested Indicator may be set to indicate "Transport bearer shall not be established," which indicates that it is unnecessary to implement MDC for the UE service associated with the indication information, or it may be set to indicate "Transport bearer may not be established," which indicates that the non-serving NodeB determines whether to implement MDC for the UE service associated with the indication information. When the indicator is not carried, the meaning is the same as that of the message in the prior art. For example, in traditional MDC mode, the message indicates that all the UE services need to undergo MDC.

It should be noted that the indication information is associated with the current services of the UE on a one-to-one basis. Taking a service that includes a CS voice service and an HSUPA service as an example, the RNC may set the indicator to "Not carried" for each MAC-d flow of the CS voice service to inform the non-serving NodeB that the non-serving NodeB may determine that the CS voice service needs to undergo MDC according to the traditional MDC mode; the RNC may set the indicator to "Transport bearer shall not be established" for the HSUPA service to inform the non-serving NodeB of the fact that the HSUPA service does not need to undergo MDC. Certainly, the RNC may set the indicator to "Transport bearer may not be established" for the CS voice service or HSUPA service. In this case, after receiving the indication information, the non-serving NodeB determines whether to perform MDC on the service associated with the indication information or not. If the non-serving NodeB determines not to perform MDC on the service, the non-serving NodeB sends a response message which carries "Transport bearer is not established" to the RNC. For better description, it is supposed in this embodiment that the indicator is "Transport bearer shall not be established."

Or, the indication mode may be: The RNC informs the non-serving NodeB of the fact that the services carried on the DCH need to undergo MDC and that the services carried on the E-DCH do not need to undergo MDC; then, the non-serving NodeB may judge whether to perform MDC according to the channel type.

Step 202: The non-serving NodeB receives the indication information from the RNC, and determines whether the UE service includes a service that needs to undergo MDC according to the indication information.

The non-serving NodeB receives the indication information from the RNC, and judges whether the UE service includes a service that needs to undergo MDC according to the indication information; if the UE service includes a service that needs to undergo MDC, the process proceeds to step 203. In this embodiment, it is supposed that the judgment result is positive. Indicators for both the CS voice service (indicating that the CS voice service needs to undergo MDC) and the HSUPA service (indicating that the HSUPA service does not need to undergo MDC) are available in step 201. Thus, the non-serving NodeB may know that the UE service includes a service that needs to undergo MDC according to the two indicators before demodulating the data. Then, the process proceeds to step 203.

In this step, if the judgment result is negative, that is, if the UE service does not include a service that needs to undergo MDC, the non-serving NodeB does not judge whether to allocate demodulation resources.

Step 203: The non-serving NodeB judges whether the UE service data meets the condition for allocating demodulation resources. If the judgment result is positive, the process proceeds to step 204; otherwise, the process proceeds to step 205.

This step is the same as step 101 in the first embodiment, and will not be further described.

Step 204: The non-serving NodeB allocates demodulation resources for the service data meeting condition, demodulates the service data, and forwards the demodulated service data to the RNC for MDC.

In this step, the non-serving NodeB allocates demodulation resources for the TB associated with the CS voice service. Other steps such as demodulating the data on the uplink control channel and uplink data channel, encapsulating the demodulated uplink service data into a data frame, and sending the encapsulated data frame to the RNC are the same as those in the first embodiment, and will not be further described in this embodiment.

Because the judgment condition about whether to allocate demodulation resources may be set reasonably, the indication result about whether to perform MDC sent by the RNC should be consistent with the judgment result about whether to allocate demodulation resources for a certain service. Taking a CS voice service as an example, the RNC informs that this service needs to undergo MDC, and the non-serving NodeB also determines to allocate demodulation resources for this service.

Certainly, the following case may occur: The RNC sends an indication information indicating that a service needs to undergo MDC, but the non-serving NodeB determines not to allocate demodulation resources for the service; or the RNC sends two indications for two services: one indication indicates that MDC is required and the other indication indicates that MDC is not required, but the non-serving NodeB allocates demodulation resources for the service that does not need to undergo MDC. In this case, the non-serving NodeB does not need to forward the data allocated demodulation resources to the RNC. The non-serving NodeB may determine whether to discard the data or process the data in other modes, which is not limited in this embodiment of the present invention. However, the preceding case seldom occurs, and the overall performance is not affected. This may also be understood as certain costs paid to save demodulation resources.

Similarly, the case that the serving radio link preempts the demodulation resources of the non-serving link may also occur in this embodiment.

Step 205: The non-serving NodeB demodulates only the data on the uplink control channel to control the uplink interferences of the UE.

The second embodiment describes the process of informing the non-serving NodeB of whether a service that needs to undergo MDC is available according to the indication information sent from the RNC. It should be noted that the non-serving NodeB may also know whether a service that needs to undergo MDC is available according to the presetting of the system. In the latter mode, the non-serving NodeB knows whether a service that needs to undergo MDC is available according to the preset rule of the system, and then judges whether to allocate demodulation resources for the service.

The preset rule of the system may be as follows: In traditional MDC mode, all the services of the NodeB may be set to undergo MDC; that is, all the services of the NodeB need to be allocated with demodulation resources and demodulated. In this case, the non-serving NodeB always needs to judge whether to allocate demodulation resources because all the services include a service that need to undergo MDC by default. Alternatively, all the services of some NodeBs may be set to undergo MDC. Thus, when those NodeBs set to perform MDC act as the non-serving NodeBs, they need to judge whether to allocate demodulation resources. Certainly, if a NodeB is preset not to perform MDC by the system, it does not need to judge whether to allocate demodulation resources.

The preset rule may be set by the system, for example, the OMC. After the system sets the preset rule or the preset rule is pre-configured in each network node (for example, the NodeB and RNC in the WCDMA system, or the NodeB in the E-HSPA or LTE/SAE system), or the preset rule is pre-configured in one or some network nodes, the network nodes configured with the preset rule inform other network nodes of the preset rule. Or, the preset rule may be set in the non-serving NodeB because only the non-serving NodeB is directly related to the preset rule.

Figure 3:
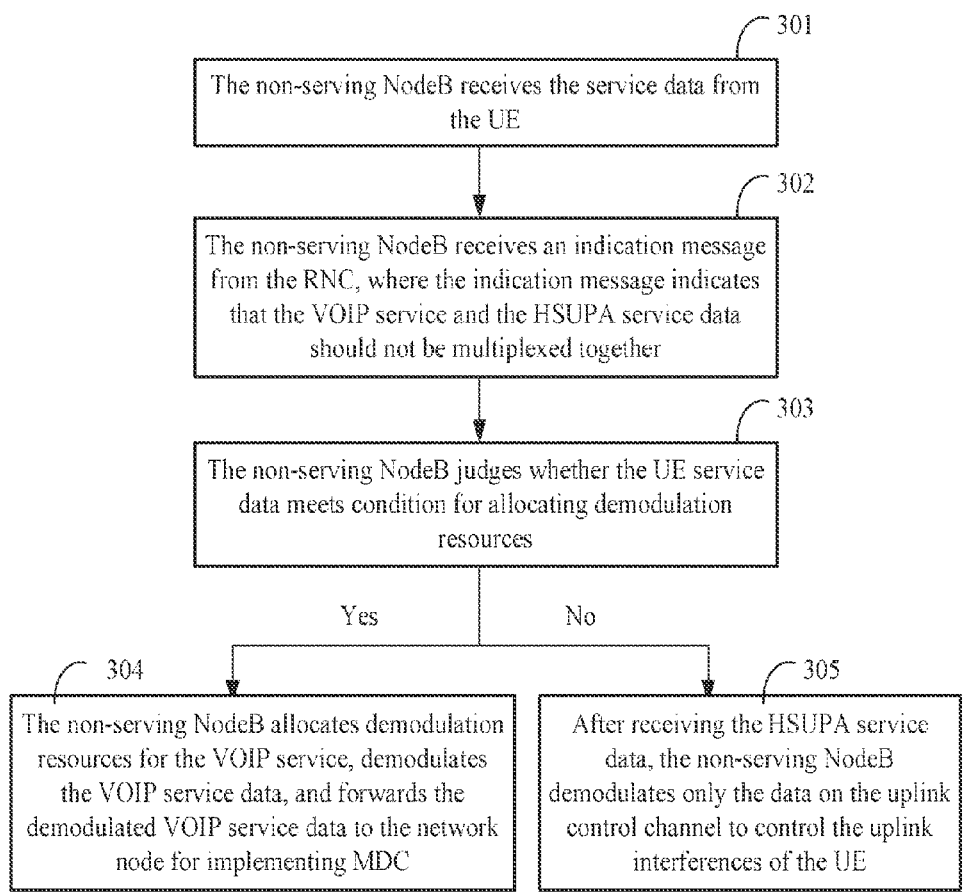
FIG. 3 is a schematic flowchart of a method for implementing MDC in a WCDMA system in a third embodiment of the present invention.

On the basis of technical solutions provided in the first and second embodiments, if the UE has two HSUPA services (high-speed packet access service data, also the services carried on the E-DCH), one of which needs to undergo MDC and the other does not need to undergo MDC, a problem about whether the two services can be multiplexed occurs. Solutions to this problem will be described in detail in a third embodiment shown in FIG. 3, which provides a method for implementing MDC in the WCDMA system. The third embodiment provides the following two solutions:

1. Mode Based on the Indication Message of the RNC

Supposing the UE has two HSUPA services: low-speed VOIP service and HSUPA upload service, the RNC may set the E-DCH MAC-d flows with different service features not to be multiplexed in the E-DCH MAC-d Flow Multiplexing List of a radio bearer (RB) message when the RNC establishes the RB with the UE. That is, VOIP service and HSUPA upload service will not be multiplexed in one MAC-d Flow. Accordingly, the VOIP service and HSUPA upload service will not be multiplexed in a same TB of the air interface.

In addition, when establishing the radio link (RL) of the non-serving NodeB, the RNC may inform the non-serving NodeB of the fact that the E-DCH MAC-d flows with different service characteristics may undergo MDC or not undergo MDC and cannot be multiplexed through the E-DCH MAC-d Flow Multiplexing List in an RL message. Generally, the low-speed real-time VOIP service needs to undergo MDC, while the high-speed non-real-time data upload service does not need to undergo MDC. Both the services are associated with different E-DCH MAC-d flows. After receiving the indication information, the non-serving NodeB dynamically judges which E-DCHs (the physical channel associated with the E-DCH is E-DPDCH) need to be allocated uplink demodulation resources according to the TB size. Then, when the non-serving NodeB encapsulates the demodulated uplink service data of different characteristics into a data frame, it does not multiplex the service data together.

If the UE service includes only a CS service and an HUSPA upload service, the two services may be differentiated according to the channel type because the CS service is carried on the DCH (corresponding to the DPDCH) and the HUSPA upload service is carried on the E-DCH (corresponding to the E-DPDCH).

2. Mode Based on Presetting of the System

The uplink data that needs to undergo MDC and the uplink data that does not need to undergo MDC should be set not to be multiplexed in a same MAC-d flow. Accordingly, the uplink data that needs to undergo MDC and the uplink data that does not need to undergo MDC may not be multiplexed in a same TB of the air interface. The configuration mode is similar to the preceding mode for configuring judgment condition or preset rules, and will not be further described. In contrast, the mode based on an indication message is more flexible and preferable.

Supposing HSUPA services of different characteristics (need or do not need to undergo MDC) are not multiplexed together, the process of judging whether to allocate demodulation resources by the non-serving NodeB according to preset condition includes the following steps:

Step 301: The non-serving NodeB receives the service data from the UE.

In this step, if the UE service includes HSUPA service data that needs to and does not need to undergo MDC at the same time, that is, if the UE service includes a low-speed VOIP service and a high-speed data upload service, when establishing an RB, the UE receives an indication information from the RNC to include the VOIP service and high-speed data upload service data into different TBs of the air interface and send the data to the non-serving NodeB; the non-serving NodeB receives the service data.

Step 302: The non-serving NodeB receives an indication message from the RNC, where the indication message indicates that the VOIP service and HSUPA upload service data should not be multiplexed together.

As mentioned before, the RNC informs the non-serving NodeB of the fact that the VOIP service and HSUPA upload service data should not be multiplexed together through the RL message.

Step 303: The non-serving NodeB judges whether the UE service data meets the condition for allocating demodulation resources. If the judgment result is positive, the process proceeds to step 304; otherwise, the process proceeds to step 305.

In this step, the VOIP service data and the HSUPA service data are both carried on the E-DCH. Thus, the non-serving NodeB makes judgment according to the TB size.

Step 304: The non-serving NodeB allocates demodulation resources for the VOIP service, demodulates the VOIP service data, and forwards the demodulated VOIP service data to the network node for implementing MDC.

Similar to the preceding embodiments, this step includes the following sub-steps: allocate demodulation resources; demodulate the data on the uplink control channel and uplink data channel; encapsulate the demodulated uplink service data into a data frame; and send the encapsulated data frame to the RNC. As mentioned before, the RNC informs the non-serving NodeB of the fact that the service data that needs to and does not need to undergo MDC should not be multiplexed into the same MAC-d flow. Thus, when encapsulating the demodulated uplink service data into a data frame, the non-serving NodeB should not multiplex the uplink service data that needs to and does not need to undergo MDC.

Similarly, the case that the serving radio link preempts the demodulation resources of the non-serving link may also occur in this embodiment.

Step 305: After receiving the HSUPA service data, the non-serving NodeB demodulates only the data on the uplink control channel to control the uplink interferences of the UE.

For ease of understanding, the preceding steps of the method are described in sequence. However, it should be noted that the sequence of these steps is not strictly limited. In addition, the preceding description about whether the service rate meets the preset condition is based on whether the TB size meets a preset threshold. It is understandable that such description may also be based on whether the spreading factor meets a preset threshold.

According to the technical solution provided in the third embodiment of the present invention, the non-serving NodeB judges whether to allocate demodulation resources according to a preset condition, which avoids demodulating some data with small MDC gains. Thus, MDC is implemented in a more flexible mode, the utilization of uplink demodulation resources is improved, and the system performance is optimized. Various judgment conditions may be set to meet requirements of various scenarios.

Further, the judgment about whether to allocate demodulation resources may be combined with various MDC modes, for example: (1) traditional MDC mode, that is, MDC is always implemented; (2) enhanced MDC: when the serving NodeB determines that the data received by the serving NodeB is incorrect, the serving NodeB informs the non-serving NodeB participating in MDC of forwarding the data; (3) indication mode, in which the network node for implementing MDC informs the non-serving NodeB of whether to perform MDC through indication information. It is apparent that the judgment about whether to allocate demodulation resources may be made in any MDC mode so long as a service that needs to undergo MDC is available. Thus, the judgment mode can meet requirements of different scenarios, and improve the utilization of demodulation resources while reflecting the advantages of each solution.

Further, the judgment about whether the service includes a service that needs to undergo MDC may be made by using a mode in which the network node for implementing MDC informs the non-serving NodeB through indication information or through presetting of the system. The mode based on indication information facilitates standardization and interconnection between the equipment from multiple manufacturers. The mode based on the presetting of the system can implement optional MDC for the equipment that is not upgraded through presetting, and improve the utilization of demodulation resources.

Further, when HSUPA service data (high-speed packet access service data) that needs to and does not need to undergo MDC is available, the data should not be multiplexed into the same MAC-d flow. Accordingly, when the UE sends the service data to the non-serving NodeB through air interface, the service data that needs to and does not need to undergo MDC should not be multiplexed into a same TB of the air interface. This avoids the fact that the NodeB cannot determine whether to demodulate the TB and whether to implement uplink MDC for the MAC-d flow.

Further, when the radio link priority is considered, the demodulation resources may be preferably guaranteed for the serving radio link, and other demodulation resources may be fully used for the non-serving radio link. If demodulation resources are insufficient, the serving radio link may preempt the demodulation resources of the non-serving radio link. This further improves the utilization of demodulation resources.

What has been described is based on the WCDMA system using HSUPA. Attention should be paid to the following aspects:

If an HSPA+ system is used, the process is similar except for the following differences: (1) The network node for implementing MDC is an enhanced NodeB, namely, NodeB+; (2) The interface between NodeB+s is an Iur interface; (3) Because all the channels in the HSPA+ feature are not DCH channels but HSPA channels, the HSPA+ service cannot be differentiated by channel type. If the DCH is reserved in the system with the HSPA+ feature, the service may be differentiated by channel type.

If the MDC function is reserved in the LTE/SAE system, the differences between the LTE/SAE system and the WCDMA system are as follows: (1) The network node for implementing MDC is an E-NODEB; (2) The interface between E-NODEBs is an X2 interface; (3) Because the channel in the LTE/SAE system is different from that in the WCDMA system, this embodiment provides only the judgment method based on the TB size.

Similarly, the radio link priority may be considered in other systems. The case that the serving radio link preempts the demodulation resources of the non-serving link may also occur in other systems.

Figure 4:
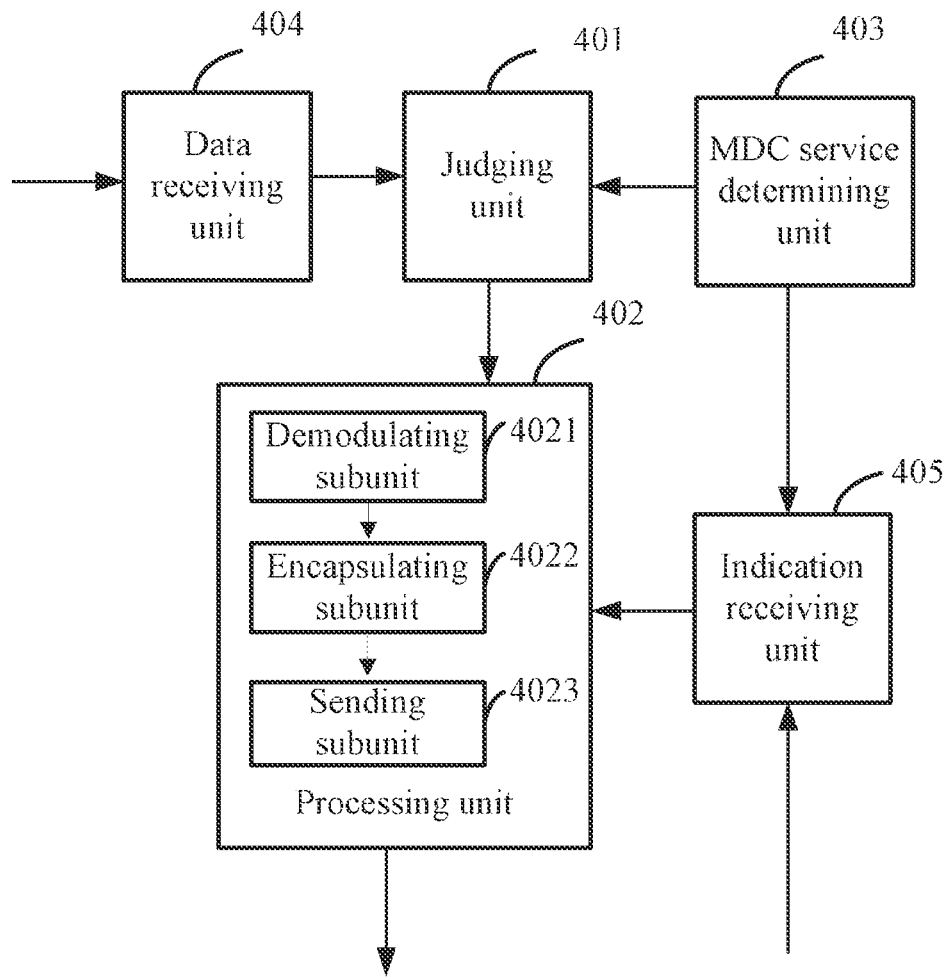
FIG. 4 shows a schematic structure of a base station for implementing MDC in a fourth embodiment of the present invention.

A fourth embodiment of the present invention provides a base station for implementing MDC. As shown in FIG. 4, the base station includes a judging unit 401, configured to judge whether the UE service data meets a condition for allocating demodulation resources; and a processing unit 402, configured to allocate demodulation resources for the service data meeting the condition; demodulate the service data according to the judgment result of the judging unit; and forward the demodulated service data to a network node for implementing MDC. The judgment condition of the judging unit 401 has been described in the method embodiments, and will not be further described.

Multiple modes are available for judging whether the UE service includes a service that needs to undergo MDC. For example, the judgment may be made according to indication information received from the network node for implementing MDC, or according to the presetting of the system. The base station may further include an MDC service determining unit 403, configured to determine that the UE service includes a service that needs to undergo MDC according to the system configuration or indication information from the network node for implementing MDC. The indication mode of the network node for implementing MDC has been described in the method embodiments, and will not be further described.

The service data that the judging unit 401 judges is the service data that the UE sends through the air interface. Thus, the base station may further include a data receiving unit 404, configured to receive the service data sent from the UE.

If the service data sent from the UE includes high-speed packet access service data that needs to and does not need to undergo MDC, for example, the VOIP service and HSUPA service, the base station may further include an indication receiving unit 405, configured to receive an indication message from the network node for implementing MDC, where the indication message indicates that the UE service data includes high-speed packet access service data that needs to and does not need to undergo MDC. In this case, the high-speed packet access service data that needs to undergo MDC and the high-speed packet access service data does not need to undergo MDC are not multiplexed into the same MAC-d flow. When the processing unit 402 processes the service data, it associates the high-speed packet access service data that needs to and does not need to undergo MDC in the UE service data with different MAC-d flows according to the indication message received by the indication receiving unit 405. The indication receiving unit 405 may be further configured to receive indication from the network node for implementing MDC, which informs the non-serving base station of whether the UE service includes a service that needs to undergo MDC.

In the technical solution provided in this embodiment, the processing unit 402 may further include:

a demodulating subunit 4021, configured to allocate demodulation resources for the service data that meets the condition for allocating demodulation resources, and demodulate the data on the uplink control channel and uplink data channel;

an encapsulating subunit 4022, configured to encapsulate the service data demodulated by the demodulating subunit into a data frame; and a sending subunit 4023, configured to send the data frame encapsulated by the encapsulating subunit to the network node for implementing MDC.

The processing unit 402 may be further configured to allocate demodulation resources for the serving radio link before allocating demodulation resources for the non-serving link. The processing unit 402 may be further configured to preempt the demodulation resources allocated for the non-serving radio link, and allocate the preempted demodulation resources for the serving radio link when demodulation resources are insufficient.

Figure 5:
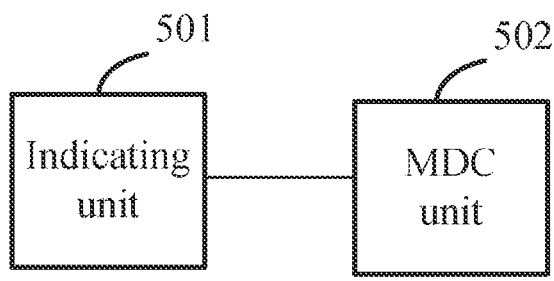
FIG. 5 shows a schematic structure of a network node for implementing MDC in a fifth embodiment of the present invention.

A fifth embodiment of the present invention provides a network node for implementing MDC. As shown in FIG. 5, the network node includes an indicating unit 501, configured to send a first indication message to a non-serving base station, where the first indication message indicates whether the UE service received by the non-serving base station needs to undergo MDC; and an MDC unit 502, configured to receive the service data forwarded by the non-serving base station and implement MDC for the received service data.

As mentioned in the preceding embodiments, if the UE service data includes high-speed packet access service data that needs to and does not need to undergo MDC at the same time, the data that needs to and does not need to undergo MDC should not be multiplexed into a MAC-d flow. The indicating unit 501 of the network node may be further configured to send a second indication message to a non-serving base station, where the second indication message indicates that the high-speed access packet service data that needs to and does not need to undergo MDC in the UE service data received by the non-serving base station should not be multiplexed into the same MAC-d flow.

Accordingly, the high-speed access packet service data that needs to and does not need to undergo MDC should not be multiplexed into the same TB of the air interface. The indicating unit 501 may be further configured to send a third indication message to the UE, where the third indication message indicates that the high-speed access packet service data that needs to and does not need to undergo MDC need to be included in different TBs of the air interface.

Figure 6:
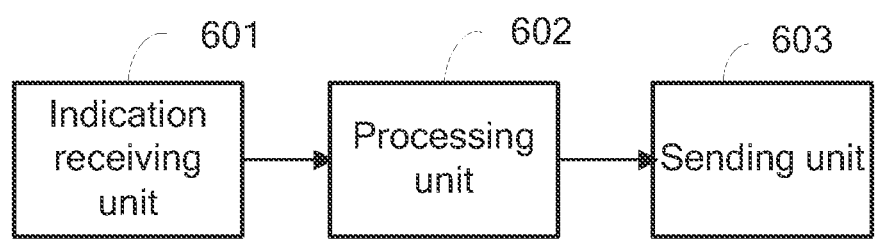
FIG. 6 shows a schematic structure of a UE for implementing MDC in a sixth embodiment of the present invention.
Figure 7:
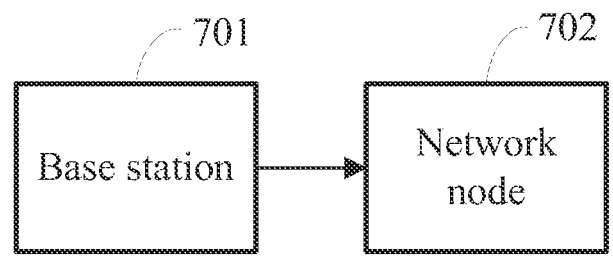
FIG. 7 shows a schematic structure of a communication system for implementing MDC in a seventh embodiment of the present invention.

A sixth embodiment of the present invention provides a UE for implementing MDC. As shown in FIG. 6, the UE includes an indication receiving unit 601, a processing unit 602, and a sending unit 603. The indication receiving unit 601 is configured to receive an indication message from a network node for implementing MDC, where the indication message indicates that the high-speed packet access service data that needs to and does not need to undergo MDC needs to be included into different TBs of the air interface. The processing unit 602 is configured to include the services that need to and do not need to undergo MDC into different TBs of the air interface according to the indication received by the indication receiving unit. The sending unit 603 is configured to send the TBs of the air interface processed by the processing unit to a non-serving base station.

A seventh embodiment of the present invention provides a communication system for implementing MDC. The communication system includes a base station 701 and a network node 702. The base station 701 is configured to receive UE service data from the UE, judge whether the UE service data meets a condition for allocating demodulation resources, allocate demodulation resources for the service data, demodulate the service data, and forward the demodulated service data to the network node 702 for implementing MDC. The network node 702 for implementing MDC is configured to receive service data forwarded by the base station 701, and implement MDC for the received service data. It is understandable that the base station and network node in the system may include all the function modules of the corresponding equipment in the previous embodiment and comply with the logical or physical relation between the function modules in the previous embodiment.

It should be noted that the function units shown in the accompanying drawings (or embodiments) are schematic and logical structures only. The units displayed as separate components may not be separate physically and the components displayed as units may not be physical units. That is, the components may be located in one NE or multiple NEs. In addition, the network entities provided in embodiments of the present invention may be hardware or combination of any suitable software and hardware. The method provided in embodiments of present invention may be implemented by using software. The technical solutions provided in embodiments of the present invention may be implemented by data carriers or data storage apparatuses carrying the software.

As known from the preceding solutions, embodiments of the present invention provide a method, base station, network node, UE and communication system for implementing MDC, in which the non-serving base station judges whether the UE service data meets preset condition for allocating demodulation resources, and allocates demodulation resources for the service data meeting the preset condition. Thus, MDC is implemented in a more flexible mode, the utilization of uplink demodulation resources is improved, and the system performance is optimized. Benefits and logical relations of other technical features have been described in detail in the method embodiments, and will not be further described.

Although the present invention has been described through several exemplary embodiments, the invention is not limited to such embodiments. It is apparent that those skilled in the art can make various modifications and variations to the invention without departing from the spirit and scope of the invention. The present invention is intended to cover such modifications and variations defined by the following claims or their equivalents.

What is claimed is:

1. A method for implementing macro diversity combining (MDC), comprising:
   receiving, by a base station, service data from a user equipment (UE);
   determining, by the base station, the service data comprising a part of service data which needs to undergo MDC according to indication information received from a network node for implementing MDC, or according to preset configuration;
   judging, by the base station, whether the part of service data which needs to undergo MDC meets a condition for allocating demodulation resources;
   if the part of service data meets the condition for allocating demodulation resources, allocating, by the base station, demodulation resources for the part of service data,
   demodulating the part of service data; and
   forwarding the demodulated service data to the network node for implementing MDC.

2. The method for implementing MDC according to claim 1, wherein the indication information comprises:
   an indicator indicating a transport bearer shall not be established, wherein the indicator indicates that it is unnecessary to implement MDC for a part of service data associated with the indication information; or
   an indicator indicating a transport bearer may not be established, wherein the indicator indicates that the base station determines whether to implement MDC for a part of service data associated with the indication information.

3. The method for implementing MDC according to claim 1, wherein the judging comprises:
   judging whether service rate of the part of service data which needs to undergo MDC meets preset condition which is determined based on whether transport block size or spreading factor of the part of service data meets a preset threshold; or
   judging whether the part of service data which needs to undergo MDC is carried on a channel which needs to be allocated with demodulation resources; or
   judging whether the part of service data which needs to undergo MDC is carried on a channel which needs to be allocated with demodulation resources, and judging whether service rate of the part of service data which needs to undergo MDC meets preset condition, wherein the preset condition of the service rate is determined based on whether transport block size or spreading factor of the service data meets a preset threshold.

4. The method for implementing MDC according to claim 3, wherein the UE is UE1 associated with a non-serving radio link, the base station acts as non-serving cell base station of UE1 and serving cell base station of UE2, and the method further comprises that the base station preempts the demodulation resources of the non-serving radio link associated with UE1 while regarding the serving radio link associated with UE2 as high priority, if demodulation resources are insufficient.

5. The method for implementing MDC according to claim 4, further comprising:
   allocating, by the base station, demodulation resources for the service data of the UE2 before allocating demodulation resources for the service data of the UE1.

6. The method for implementing MDC according to claim 3, wherein the network node implementing MDC is a radio network controller (RNC) and the method further comprises:
   learning, by the base station, that the channel which needs to be allocated with demodulation resources is a dedicated channel (DCH) according to system configuration or indication information received from a RNC.

7. The method for implementing MDC according to claim 1, wherein the service data received by the base station comprises:
   a part of high-speed packet access service data that needs to undergo MDC and another part of high-speed packet access service data does not need to undergo MDC and wherein the two parts of high-speed packet access service data are separately contained in different transport blocks of air interface.

8. The method for implementing MDC according to claim 7, wherein receiving the service data by the base station, the method further comprises:
   sending, by the network node for implementing MDC, an indication message to the UE, wherein the indication message indicates a part of high-speed packet access service data that needs to undergo MDC and another part of high-speed packet access service data does not need to undergo MDC should be comprised in different transport blocks of air interface.

9. The method for implementing MDC according to claim 7, wherein before the forwarding, the method further comprises
   receiving, by the base station, an indication message sent by the network node for implementing MDC, wherein the indication message indicates a part of high-speed packet access service data that needs to undergo MDC and another part of high-speed packet access service data that does not need to undergo MDC should not be multiplexed into the same MAC-d flow.

10. The method for implementing MDC according to claim 1, wherein the allocating, demodulating, and forwarding comprises:
    if the part of service data meets the condition for allocating demodulation resources, allocating, by the base station, demodulation resources for the part of service data which meets the condition for allocating demodulation resources, demodulating the part of service data on an uplink data channel with the allocated demodulation resources and demodulating an uplink control channel corresponding to the part of service data;
    encapsulating, by the base station, the demodulated service data into a data frame; and
    sending, by the base station, the encapsulated data frame to the network node for implementing MDC.

11. The method for implementing MDC according to claim 1, wherein the allocating, demodulating, and forwarding comprises:
    if the part of service data does not meet the condition for allocating demodulation resources, the base station only demodulates an uplink control channel corresponding to the part of service data while no demodulation resources are allocated for the part of service data and the part of service data is not forwarded to the network node for implementing MDC.

12. A base station, for implementing macro diversity combining (MDC), comprising:
    a data receiving unit, configured to receive service data from a user equipment (UE);
    an MDC service determining unit, configured to determine that the service data comprises a part of service data that needs to undergo MDC according to a preset configuration or an indication from a network node for implementing MDC;
    a judging unit, configured to judge whether the part of service data that needs to undergo MDC meets condition for allocating demodulation resources; and
    a processing unit, configured to when the part of service data meets the condition for allocating demodulation resources, allocate demodulation resources for the part of service data, to demodulate the part of service data, and to forward the demodulated service data to the network node for implementing MDC.

13. The base station according to claim 12, further comprising:
    an indication receiving unit, configured to receive an indication message sent by the network node for implementing MDC, wherein the indication message indicates a part of high-speed packet access service data that needs to undergo MDC and another part of high-speed packet access service data that does not need to undergo MDC should not be multiplexed into the same MAC-d flow.

14. The base station according to claim 12, wherein, the processing unit is further configured to preempt the demodulation resources for a non-serving radio link and allocate the preempted demodulation resources for a serving radio link, if demodulation resources are insufficient.

15. The base station according to claim 12, wherein, the processing unit comprises:
    a demodulating subunit, configured to when the part of service data meets the condition for allocating demodulation resources, allocate demodulation resources for the part of service data, and to demodulate the part of service data on an uplink data channel with the allocated demodulation resources and demodulate an uplink control channel corresponding to the part of service data;
    an encapsulating subunit, configured to encapsulate the part of service data demodulated by the demodulating subunit into a data frame; and
    a sending subunit, configured to send the data frame encapsulated by the encapsulating subunit to the network node for implementing MDC.

16. A network node, for implementing macro diversity combining (MDC), comprising:
    an indicating unit, configured to send a first indication message to a base station, wherein the first indication message indicates whether service data received by the base station from a user equipment (UE) needs to undergo MDC; and an MDC unit, configured to receive demodulated service data forwarded by the base station after the base station determines a part of the service data received from the UE needs to undergo MDC and the part of the service data meets the condition for allocating demodulation resources, allocates demodulation resources for the part of service data and demodulates the part of service data, and implement MDC for the received demodulated service data.

17. The network node according to claim 16, wherein, the indicating unit is further configured to at least one of send a second indication message to a non-serving base station or send a third indication message to the UE;

wherein the second indication message indicates that a part of high-speed access packet service data that needs to undergo MDC and another part of high-speed access packet service data that does not need to undergo MDC in the service data received by the base station should not be multiplexed into the same MAC-d flow; and wherein the third indication message indicates that a part of high-speed access packet service data that needs to undergo MDC and another part of high-speed access packet service data that does not need to undergo MDC need to be contained in different transport blocks (TBs) of air interface.

18. A user equipment (UE) for implementing macro diversity combining (MDC), comprising:

an indication receiving unit, configured to receive an indication message from a network node for implementing MDC, wherein the indication message indicates that a part of high-speed packet access service data that needs to undergo MDC and another part of high-speed packet access service data that does not need to undergo MDC need to be contained into different transport blocks of air interface;

a processing unit, configured to contain the part of high-speed packet access service data that needs to and the another part that does not need to undergo MDC into different transport blocks of air interface according to the indication message received by the indication receiving unit; and a sending unit, configured to send the transport blocks of air interface processed by the processing unit to a base station.

* * * * *